Oct. 8, 1963   D. BERLIN   3,106,409
LAUNDRY CART
Filed March 27, 1961   2 Sheets-Sheet 1
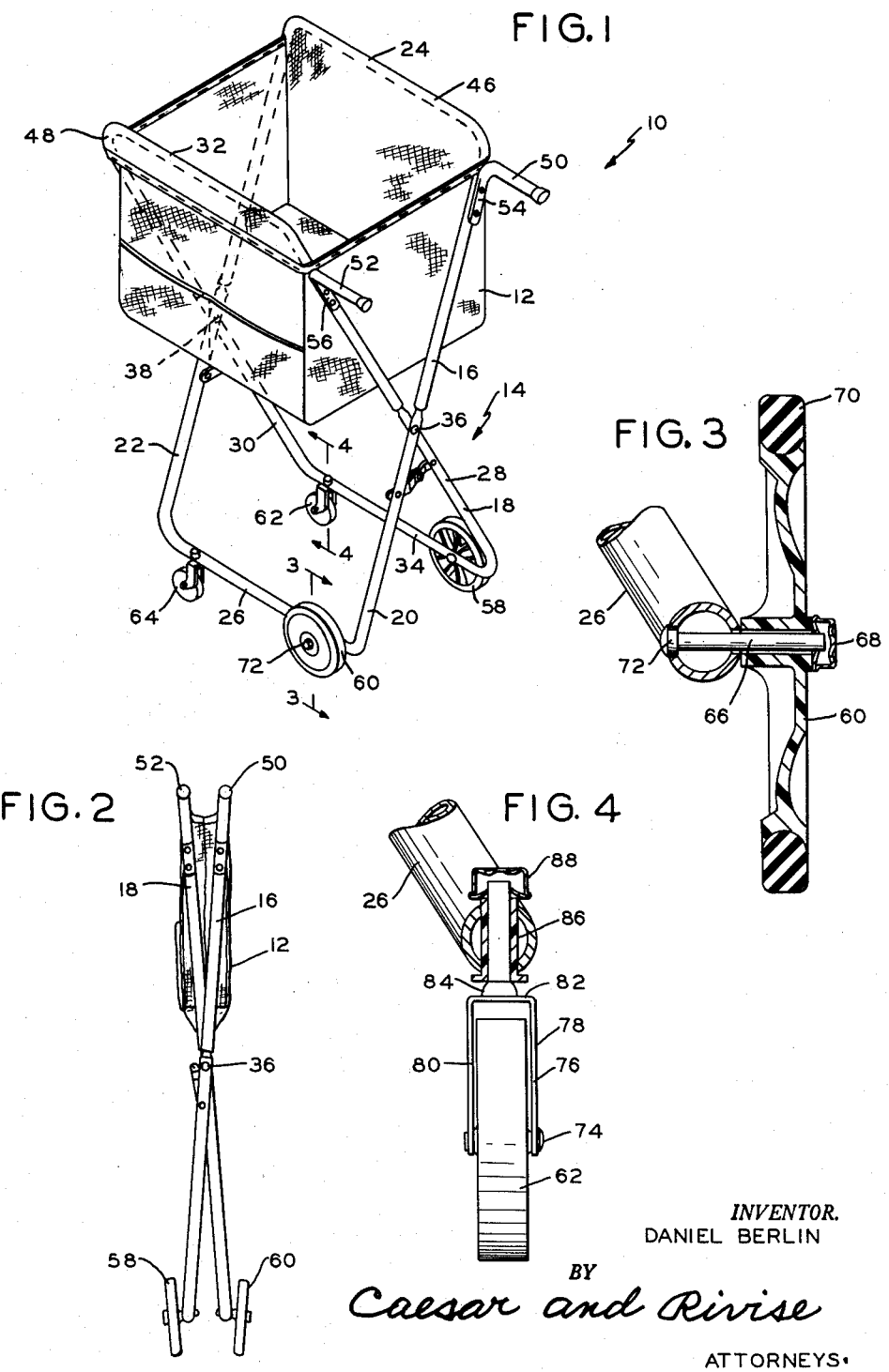
INVENTOR.
DANIEL BERLIN
BY
Caesar and Rivise
ATTORNEYS Oct. 8, 1963          D. BERLIN          3,106,409
LAUNDRY CART Filed March 27, 1961          2 Sheets-Sheet 2

INVENTOR.
DANIEL BERLIN
BY
Caesar and Rivise
ATTORNEYS.

United States Patent Office 3,106,409
Patented Oct. 8, 1963

3,106,409
LAUNDRY CART
Daniel Berlin, 4424 Paul St., Philadelphia 24, Pa.
Filed Mar. 27, 1961, Ser. No. 98,663
1 Claim. (Cl. 280—39)

This invention relates to an improved laundry cart and has as its objective the provision of a laundry cart which is efficient in use, easily stored and adapted to be folded into a compact space for shipping purposes.

Laundry carts have now become quite popular in the home. These carts are employed to hold and transport laundry to and from the washing area. Generally, such carts comprise a bag or other container which is somehow rendered portable.

It is an object of the present invention to provide a laundry cart of improved construction which may be readily folded into a compact space for purposes of storage and shipment.

Yet another object of the present invention is to provide a laundry cart of sturdy construction which will supply a reliable support for the bag or container which houses the laundry.

A further object of the present invention is to provide a laundry cart which is economically manufactured, is of strong construction and may be folded into a compact unit for purposes of storage or shipment.

The foregoing, as well as other objects of the invention, are achieved by providing a laundry cart comprising a canvas bag or container mounted on a sturdy frame of generally crossed rectangular configuration. Opposing sides of a generally rectangular laundry bag are fitted over the top side of two rectangular frame members which comprise the frame. The rectangular frame members are pivoted at their midpoints and a collapsible member is secured to the pivoted legs of the frame to limit the spreading of the rectangular frame members. Two different types of wheels are secured to the lower sides of the rectangular frame. One set of wheels is rotatively secured to the frame so as to rotate in a given plane whereas the second set of wheels is swivelly attached to the frame.

Other objects and many of the attendant advantages of this invention will be readily appreciated as the same becomes better understood by reference to the following detailed description when considered in connection with the accompanying drawings wherein:

FIG. 1 is a perspective view of a laundry cart embodying the present invention;

FIG. 2 is a side elevational view of the laundry cart of FIG. 1 in the collapsed position;

FIG. 3 is an enlarged sectional view taken along the lines 3—3 of FIG. 1;

FIG. 4 is an enlarged sectional view taken along the lines 4—4 of FIG. 1;

Referring now in greater detail to the various figures of the drawings wherein similar reference characters refer to similar parts, an improved laundry cart embodying the present invention is generally shown at 10 in FIG. 1.

Figure 5:
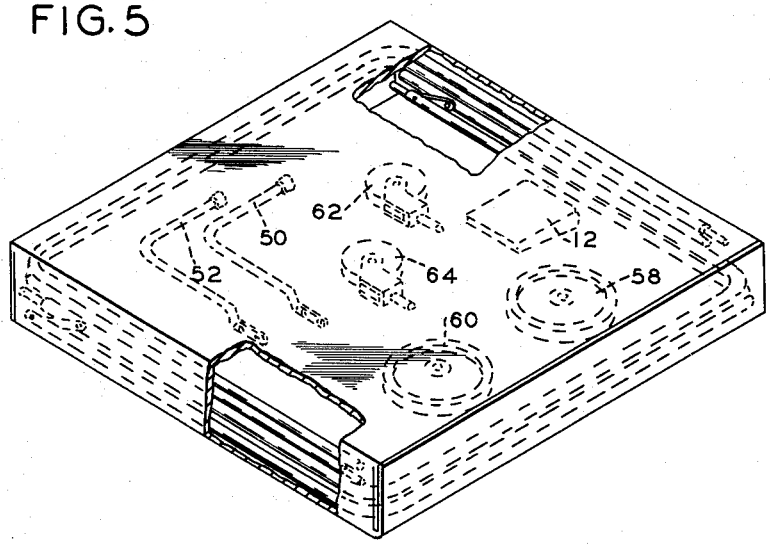
FIG. 5 is a perspective view of the device of FIG. 1 disassembled and arranged in a box for shipment.

Device 10 basically comprises a laundry bag or container 12 mounted on a frame 14 basically consisting of two crossed rectangular frame members 16 and 18. Rectangular frame member 16 comprises long sides 20, 22 and upper short side 24 and lower short side 26. Rectangular frame member 18 basically comprises long sides 28 and 30, upper short side 32 and lower short side 34.

The two rectangular frame members 16 and 18 are pivotally secured at 36 and 38. The pivotal securement 36 is positioned at the midpoint of long side members 20 and 28 and the pivotal securement at 38 is effected between long side members 22 and 30.

Figure 6:
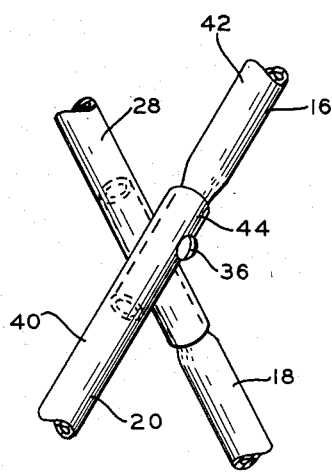
FIG. 6 is a fragmentary enlarged perspective view of a detail of FIG. 1 showing the pivotal mounting of the rectangular frame members.

As shown in FIG. 6, each rectangular frame member basically comprises two complementary U-shaped sections, the long side 20, for example, being comprised, as shown in FIG. 6, of leg 40 of a lower U-shaped section and leg 42 of an upper U-shaped section. The upper leg 42 has its free end formed into a narrow section 44 which interfits in the open free end of the lower leg 40. Thus, the pivotal securement at 36 also secures the upper and lower sections of the rectangular frame member 16 together to comprise long side 20. The other long sides are similarly constructed.

The bag 12 is of a generally parallelepiped configuration, being open at its top in order to receive the laundry and other items placed therein. Two of the upper sides of the bag 12 have opposed flaps 46 and 48 formed therein which respectively fit about upper short side members 24 and 32 of rectangular frame members 16 and 18. Thus, laundry bag or container 12 is suspended from the two upper short sides of the rectangular frame.

As shown in FIG. 1, handle members 50 and 52 are secured via respective legs 54 and 56 to the upper end of long sides 20 and 28 of frame members 16 and 18.

Secured to the lower short sides 26 and 34 of rectangular frame members 16 and 18 are opposing wheels 58 and 60, and opposing wheels 62 and 64. The rearward set of wheels 58 and 60 rotate about a single axis, whereas the forward set of wheels are swivelly secured to the rectangular frame and thus rotate about more than one axis.

As shown in FIG. 3, the wheel 60 is secured to the lower short side 26 of the frame member 16 by means of a rod 66 projecting through the side member 26 and through a central opening in the wheel 60 and fastened thereto by a cotter pin or equivalent means (not shown). A hub 68 is provided for appearance purposes. A tread member 70 is secured about the periphery of the wheel 60. A stop member 72 is provided on the rod 66 to prevent outward movement thereof.

The wheel 62, as shown in FIG. 4, is pivotally mounted on an axis 74 appropriately secured through the center of the wheel 62. A U-shaped member 76, including legs 78 and 80, is also secured to the axis 74. The legs 78 and 80 are united by a bridging section 82 to which is secured an upstanding pin 84. Pivotally nesting about the pin 84 is a bushing 86 which projects through an opening in the short side 26 of frame member 16 and which is secured therein by the hub 88.

The device of FIG. 1 is simply folded, as shown in FIG. 2. The wheels, handles and laundry bag may be removed from the device and the pivoted frame positioned in a box, as shown in FIG. 5, with the rectangular frame members separated into component halves. The wheels, handles and laundry bag are then positioned inside the collapsed frame.

It is thus seen that a laundry cart of low cost and easy storage is provided. Moreover, the present laundry cart may be shipped in collapsed condition in a container of relatively small dimensions and readily assembled.

Obviously, many modifications and variations of the present invention are possible in the light of the above teachings. It is, therefore, to be understood that within the scope of the appended claim, the invention may be practiced otherwise than as specifically described.

What is claimed as the invention is:

A laundry cart comprising in combination a frame and a canvas laundry container suspended therefrom, said frame comprising two members of rectangular configuration, each frame member including a pair of opposed parallel long sides, an upper horizontal short side and a lower horizontal short side, each long side of a rectangular frame member being secured by removable pivotal means to a long side of the other rectangular member, said container being secured to the upper horizontal short sides of said rectangular frame members to suspend the container therefrom, each rectangular frame section comprising an upper U-shaped section and a lower U-shaped section, one of said sections having free ends terminating in narrow sections interfitting in openings in the free ends of the other section whereby said cart may be packaged in a compact container, and said pivotal means projecting through the interfitting sections whereby said interfitting sections are secured in place.

References Cited in the file of this patent

UNITED STATES PATENTS

| | | |
|---|---|---|
| 1,941,902 | Lewis | Jan. 2, 1934 |
| 2,215,131 | Page | Sept. 17, 1940 |
| 2,463,124 | Sims | Mar. 1, 1949 |
| 2,467,900 | Maine | Apr. 19, 1949 |
| 2,847,227 | Lankford | Aug. 12, 1958 |
| 2,967,716 | Murcott | Jan. 10, 1961 |